(No Model.)
W. J. ROSS.
BICYCLE BRAKE.
No. 537,717. Patented Apr. 16, 1895.
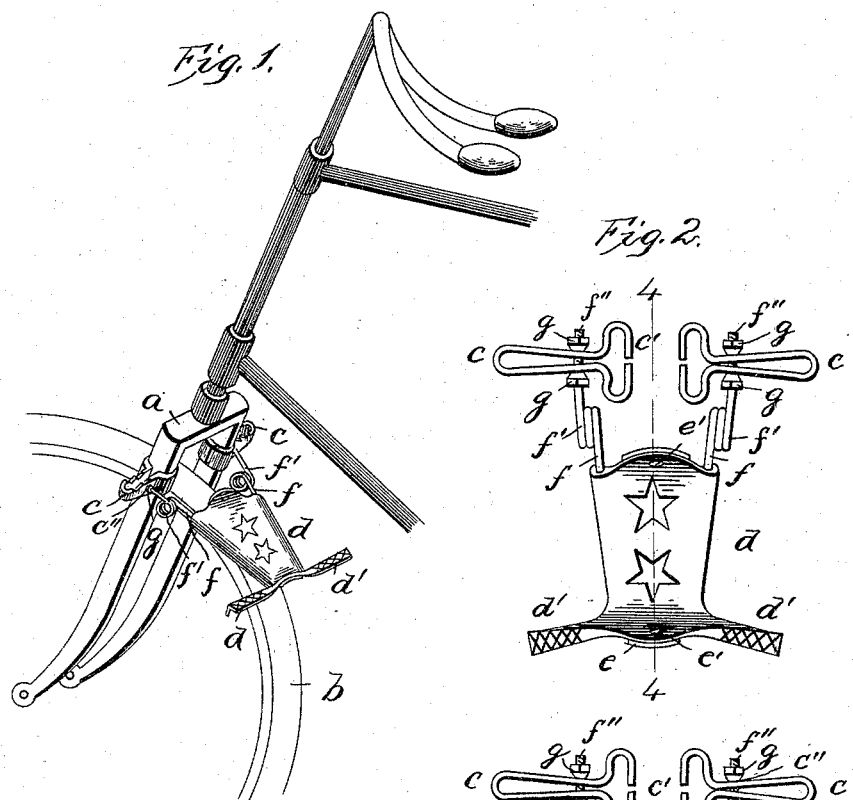
Witnesses:
E. C. Duffy
Chas. M. Werle
Inventor
W. J. Ross
per J. E. Duffy
Attorney

UNITED STATES PATENT OFFICE.

WILLIAM J. ROSS, OF BOSTON, MASSACHUSETTS, ASSIGNOR OF ONE-HALF TO THE STAR FOOT-BRAKE COMPANY, OF SAME PLACE.

BICYCLE-BRAKE.

SPECIFICATION forming part of Letters Patent No. 537,717, dated April 16, 1895.

Application filed November 12, 1894. Serial No. 528,519. (No model.)

*To all whom it may concern:*

Be it known that I, WILLIAM J. ROSS, of Boston, in the county of Suffolk and State of Massachusetts, have invented certain new and useful Improvements in Bicycle-Brakes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain improvements in bicycles, and more particularly to an improved bicycle brake.

The object of the invention is to provide an improved foot brake for bicycles exceedingly strong, durable and effective in construction and easily attached to any bicycle, and which is particularly adapted for employment with pneumatic tires and to be secured at the front fork by means of the coasters.

The invention consists in certain novel features of construction, and in combinations of parts more fully described hereinafter and particularly pointed out in the claims.

Referring to the accompanying drawings, Figure 1 is a perspective of the front portion of a bicycle showing the brake applied to the front fork thereof. Fig. 2 is a detail top plan of the brake and coasters. Fig. 3 is a bottom plan. Fig. 4 is a section on the line 4—4 Fig. 2.

In the drawings, $a$, is the front fork of a bicycle.

$b$, is the front wheel having a pneumatic tire.

$c\ c$, are the coasters. Each coaster is preferably, although not necessarily formed of a single piece of spring metal, doubled to form the outer or supporting end and the two inner hooked ends $c'$ to fit opposite sides of a leg of the fork and to be clamped rigidly thereon as hereinafter set forth. The sides of each coaster have the registering opening $c''$.

$d$, is a brake shoe, plate or casting, at one end having the oppositely extending foot rests $d'\ d'$. The ends of this plate are preferably curved up slightly for obvious reasons and a suitable friction surface is applied to the under surface of the shoe. This surface, preferably although not necessarily consists of a piece of heavy leather $e$, extending longitudinally of the shoe and at its ends secured to the bent up ends of the shoe by suitable means, as rivets $e'$. This leather is so secured as to bulge out between its ends and thus forms a yielding bearing surface for the shoe.

$f\ f$, are the spring supports for the shoe, each consisting of a spring rod secured longitudinally at an edge of the shoe and extending forwardly therefrom and provided with spring coil $f'$. The outer straight end $f''$ extends forwardly from the spring coil and is screw threaded and passed through the openings in the sides of the coaster at that side of the fork. Two nuts $g\ g$, are arranged on said threaded end at opposite sides of the coaster. The two supporting rods extend forwardly from opposite edges of the shoe to the outer sides of the fork and through their respective coasters.

The device can be easily applied to any bicycle by loosening the nuts $g$, so that the hooked ends of the coasters can embrace their respective legs of the front fork with the shoe extending rearwardly just over the wheel tire and normally out of contact therewith. The nuts are then screwed up toward their respective coasters so as to rigidly clamp the coasters in their proper positions supporting the shoe.

The operation is obvious, and the device is a most convenient and necessary attachment for pneumatic bicycles, and can be used without endangering the tire by simply placing either foot on either foot rest $d'$ and pressing down with the desired force.

This brake can be attached to the original coasters on any machine. The threaded rods can take the place of the original bolts in the coasters. Tapered nuts can be employed adapted to variously sized openings in coasters of different makes.

The simplicity and advantages by securing coasters by the brake support and supporting the brake from the coasters are clear.

It is evident that various slight changes might be made in the forms, constructions and arrangements of the parts described without departing from the spirit and scope of my invention. Hence I do not wish to limit myself to the exact construction herein set forth, but consider myself entitled to all such changes as fall within the spirit and scope of my invention.

What I claim is—

1. The article of manufacture composed of the brake shoe having foot rests, the spring rods secured thereto on opposite sides thereof and extending forwardly therefrom with the spring coils, the front ends of said rods being threaded, the expansible coasters on the threaded ends of said rods, and the clamping nuts on said threaded ends to clamp the coasters to the fork legs and secure the brake shoe, substantially as described.

2. The foot brake comprising the brake shoe having the lateral foot rests and its front and rear ends turned up and perforated, the flexible strip extending longitudinally of the under side of the shoe and bulged down between its ends and secured by rivets passing through the perforations of said upturned ends, and the two spring supporting rods secured longitudinally on the under side of the shoe and extending forwardly therefrom and having their front ends threaded and each provided with the tapered threaded nuts thereon, to clamp the coasters on the fork legs, substantially as set forth.

In testimony that I claim the foregoing as my own I affix my signature in presence of two witnesses.

WILLIAM J. ROSS.

Witnesses:
 EDWIN H. DARLING,
 HENRY P. ROBERTS.